Aug. 29, 1939.　　K. SCHRÖTER ET AL　　2,171,149
RESILIENT MOUNTING
Filed March 22, 1938

Inventors
KURT SCHRÖTER
HANS O. SCHRÖTER
By Richards & Geier
Attorneys

Patented Aug. 29, 1939

2,171,149

UNITED STATES PATENT OFFICE 2,171,149

RESILIENT MOUNTING

Kurt Schröter and Hans O. Schröter, Wechmar, Gothaland, Germany

Application March 22, 1938, Serial No. 197,468
In Germany August 7, 1936

4 Claims. (Cl. 267—21)

The invention relates to a resilient mounting particularly for the suspension of power-driven vehicles in which the wheels are connected to rocking levers or quadrilateral linkages, the movements of the axles of which are resisted by elastic bodies of rubber or the like, the cross-section of which increases outwardly. According to the present invention, the elastic body of rubber or the like is fixed between two co-axially mounted curved elements, for example by being vulcanized to them, one of said elements being rigidly connected to the supporting axle and the other to a carrier for the axle bearing, the elastic body also serving to support the axle. The two elements have different curvatures such that the cross-section of the elastic body lying between them increases outwardly. By his method of mounting and by suitable selection of the curvatures of the fixing elements, a uniform stressing of the rubber body in all zones is obtained even at the greatest possible rotational displacement of the axle.

By reason of the curvature of the elements and of the rubber body lying between them, the supporting axle of the rocking lever or the like is well supported and guided in relation to radially acting forces. It is known that rubber is less resilient under a compressive force than when subjected to a torsional shearing force. This fact is made use of by the curved form of the supporting elements for the rubber body, in that while the forces exerted radially on the axle of the rocking lever subject the rubber to compressive stresses, the rubber body is subjected to torsional shearing forces by the wheel springing.

Provision is made also for readily adjustable frictional damping for the oscillations of the axle, in association with the rubber springing, by utilising a component of the axle support for the purpose, which component is ordinarily necessary.

One form of the invention is illustrated by way of example in the accompanying drawing, in which:—

Figure 1:
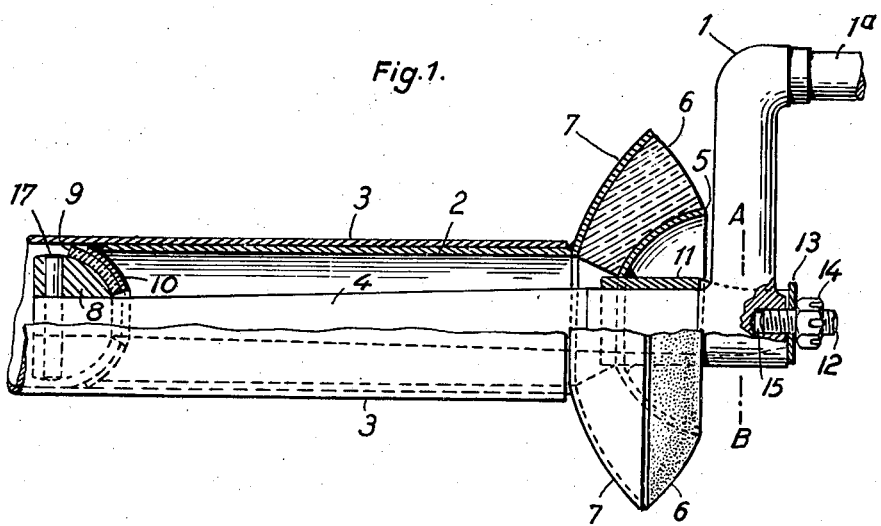
Figure 1 is an elevation, partly in longitudinal section, of an assembly embodying a rocking lever with a stub axle and supporting axle, together with a mounting for the supporting axle.
Figure 2:
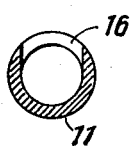
Figure 2 is a cross-section taken on the line A—B of Figure 1.

A short rocking lever 1, which is provided with a stub axle 1a for the wheel and a supporting axle 4, is mounted, by means of a sleeve 2, in a tubular cross-bearer 3 of the vehicle frame. The axle 4 of the rocking lever 1 is provided at its outer end with a curved fixing ring 5, to the convex side of which an elastic mass 6 of rubber or the like is vulcanized. A metal ring 7 of greater radius of curvature than the ring 5 is rigidly connected to the sleeve 2. The rubber body 6 is vulcanized to the concave side of the ring 7.

The radius of curvature of the ring 5 for the rubber body 6 is substantially shorter than that of the ring 7, and the two radii are so related to each other that even with the greatest rotational displacement of the axle 4 in relation to the bearing sleeve 2, the rubber body 6 is stressed in all zones uniformly in consequence of the outwardly increasing cross-section of the rubber body 6.

The new arrangement permits the effective cooling of the rubber body 6 by air currents.

The fixing ring 5 is mounted so as to be longitudinally displaceable on the axle 4 and is secured against rotational displacement on said axle by connecting it rigidly with a socket 11 which is slotted on one side by 16 so that it may be slid on to the rocking lever 1. By sliding the socket 11 inwardly, the outer ring 5 approaches the inner ring 7 and the rubber body 6 is thereby preloaded in the axial direction.

The sliding of the socket on the axle 4 may be effected by an adjusting screw 12 which is screwed into a screw-threaded hole 15 in the outer end of said axle and is provided with a nut 14 and a disc 13, the disc 13 being caused to bear on to the socket 11 when the nut is screwed onto the screw 12.

A hemispherical member 8 is secured to the inner end of the axle 4 by a stud 17 and is supported by a hemispherical bearing shell 10, fixed to the sleeve 2, through the intermediary of a friction lining 9. An asbestos brake lining of great compressive strength is preferably employed as the friction lining 9.

The adjustment of the socket 11 as above described also regulates the pressure of the hemispherical member 8 against the bearing 10. Upon a tightening of the nut 14 and the consequent inward displacement of the socket 11, the axle 4 tends to move outwards from the sleeve 2, whereby the hemispherical member 8 is pressed against the bearing 10 and so serves to centre and guide the inner end of the axle 4.

The elements 5, 7 having different curvature can also be of other form instead of rings as shown in the drawing.

We claim:

1. A resilient mounting for the suspension of power-driven vehicles and the like, said mounting comprising an elastic body which increases outwardly in cross-section, two curved members firmly connected with said elastic body and situated on two sides thereof, an axle, means connecting one of said curved members with said axle, an axle bearing connected with said axle, and a sleeve connected with said axle bearing and the other one of said curved members, said sleeve constituting a carrier for the axle bearing, said curved members and said elastic body being situated at the outer end of said sleeve.

2. A resilient mounting for the suspension of power-driven vehicles and the like, said mounting comprising an elastic body which increases outwardly in cross-section, two members firmly connected with said elastic body and situated on two sides thereof, a supporting axle, means connecting one of said members with said supporting axle, a hemispherical member connected with said axle, an axle bearing, a friction lining situated between the hemispherical member and the hemispherical axle bearing, and means connecting the axle bearing with the other one of the two members.

3. A resilient mounting for the suspension of power-driven vehicles and the like, said mounting comprising an elastic body which increases outwardly in cross-section, an outer curved member and an inner curved member firmly connected with said elastic body and situated on two sides thereof, an axle, means adjustably supporting the outer curved member upon said axle, a bearing connected with said axle, and means connecting the inner curved member with said bearing.

4. A resilient mounting for the suspension of power-driven vehicles and the like, said mounting comprising an elastic body which increases outwardly in cross-section, two curved members firmly connected with said elastic body, said curved members having different curvatures and being situated on two sides of the elastic body to transmit axial and radial forces to the elastic body, an axle, means connecting one of said curved members with said axle, an axle bearing connected with said axle, and a sleeve connected with said axle bearing and the other one of said curved members, said sleeve constituting a carrier for the axle bearing, said curved members and said elastic body being situated at the outer end of said sleeve.

KURT SCHRÖTER.
HANS O. SCHRÖTER.